US006487479B1

(12) United States Patent
Nelson

(10) Patent No.: US 6,487,479 B1
(45) Date of Patent: Nov. 26, 2002

(54) METHODS AND SYSTEMS FOR AVIATION COMPONENT REPAIR SERVICES

(75) Inventor: John Randall Nelson, West Chester, OH (US)

(73) Assignee: General Electric Co., Schenectady, NY (US)

(*) Notice: Subject to any disclaimer, the term of this patent is extended or adjusted under 35 U.S.C. 154(b) by 0 days.

(21) Appl. No.: 09/724,123

(22) Filed: Nov. 28, 2000

Related U.S. Application Data

(60) Provisional application No. 60/175,178, filed on Jan. 7, 2000.

(51) Int. Cl.[7] .............................................. G06F 19/00
(52) U.S. Cl. ............................ 701/29; 701/33; 701/35; 709/223
(58) Field of Search ............................. 701/29, 35, 33, 701/3, 30; 705/16, 5, 37, 28; 707/10, 513; 709/217, 223, 232; 713/165, 201

(56) References Cited

U.S. PATENT DOCUMENTS

| | | | | |
|---|---|---|---|---|
| 4,404,639 A | * | 9/1983 | McGuire et al. | 701/114 |
| 5,414,626 A | * | 5/1995 | Boorse et al. | 345/634 |
| 5,552,987 A | | 9/1996 | Barger et al. | 701/14 |
| 5,717,595 A | * | 2/1998 | Cherrington et al. | 345/733 |
| 5,729,452 A | * | 3/1998 | Smith et al. | 700/31 |
| 5,808,907 A | * | 9/1998 | Shetty et al. | 340/989 |
| 5,870,464 A | | 2/1999 | Brewster et al. | 379/219 |
| 5,931,877 A | * | 8/1999 | Smith et al. | 701/29 |
| 5,960,196 A | * | 9/1999 | Carrier et al. | 707/203 |
| 6,003,808 A | * | 12/1999 | Nguyen et al. | 244/1 R |
| 6,052,631 A | * | 4/2000 | Busch et al. | 701/29 |
| 6,067,486 A | | 5/2000 | Aragones et al. | 701/29 |
| 6,115,656 A | * | 9/2000 | Sudolsky | 701/3 |
| 6,151,582 A | | 11/2000 | Huang et al. | 705/8 |
| 6,151,601 A | * | 11/2000 | Papierniak et al. | 707/1 |
| 6,233,577 B1 | * | 5/2001 | Ramasubramani et al. | 380/30 |
| 6,263,265 B1 | * | 7/2001 | Fera | 246/122 R |
| 6,263,268 B1 | * | 7/2001 | Nathanson | 340/870.01 |
| 6,263,322 B1 | * | 7/2001 | Kirkevold et al. | 705/400 |
| 6,308,120 B1 | * | 10/2001 | Good | 340/438 |
| 6,314,422 B1 | * | 11/2001 | Barker et al. | 340/539 |
| 6,321,142 B1 | * | 11/2001 | Shutty | 701/1 |
| 6,330,499 B1 | * | 12/2001 | Chou et al. | 701/32 |
| 6,336,079 B1 | * | 1/2002 | Knestel | 702/123 |
| 6,338,152 B1 | * | 1/2002 | Fera et al. | 709/207 |

* cited by examiner

*Primary Examiner*—Tan Nguyen
(74) *Attorney, Agent, or Firm*—William Scott Andes; Armstrong Teasdale LLP

(57) ABSTRACT

A system for accessing aircraft engine component repair information by internal users and external customers is described. The system includes a server, at least one computer and a network connecting the computers to the server. The server is configured with a database of repair order and quote information and a plurality of user interfaces associated with the repair information. The user interfaces allows a user to input information into the database, which is downloaded to the customer in response to an inquiry.

19 Claims, 9 Drawing Sheets

Online Finding Report

File Edit View Go Favorites Help

Back | Forward | Stop | Refresh | Home | Search | Favorites | History | Channels | Fullscreen | Mail | Print | Edit Address: http:\\

- Home Page
- Spare Parts
- Tech Publications
- Overhaul Status
- MCPH Billing

- Repair Status
- Initial Findings
- Repair Catalog
- New Repairs

- Warranty Claims
- Spare Engines
- Productivity Center
- Your Dashboards
- Product Support
- Web Support
- Your Account
- Products & services
- Customer Privacy
- Customer Terms

COMPONENT REPAIR ORDER

User: LAST NAME, FIRST NAME

Customer: NAME —82

Purchase Order: 80-XXXXX —84         P.O. Line: 0 —88
Customer Order: 046449 —86           c.o. Line: 1 —90
Part Name: HPT-BL-1 —92              Part Number: 9299MXXXXXX —94
Engine Model: 50 —96                 ESN: —98
S/N: MULTIPLE —100                   Quantity: 36 —102

E-MAIL A COPY | PRINTABLE VERSION

| QTY* | Finding Category —104 | Repair Category —106 | Unit Price ($) | Ext. Price ($) —108 | Part Name —110 / 112 |
|---|---|---|---|---|---|
| 6 | Repair | Tip Repair w/ Codal | 4XX | 2XXX | HPT-BL-1 |
| 5 | Repair | FULL REPAIR | 4XX | 2XXX | HPT-BL-1 |
| 9 | Non Repairable | P/F BOW GREATER THAN 0.025 INCH | | | HPT-BL-1 |
| 7 | Non Repairable | A/F DENT WITH CRACKS | | | HPT-BL-1 |
| 5 | Non Repairable | A/F CRACKS | | | HPT-BL-1 |
| 1 | Non Repairable | L/E ROOT FILLET CRACKS | | | HPT-BL-1 |
| 1 | | TIP WELD REPAIR O/MAX | | | HPT-BL-1 |
| 1 | Non Repairable | SHANK DENT WITH CRACKS AND MISSING MATERIAL —114 | | | HPT-BL-1 |

Non Repairables

Note: All prices are in US DOLLARS and subject to contract terms and conditions. Work scope is based on incoming findings and subject to possible changes as necessary during the course of repair.

⊙ CLICK HERE TO SEND US FEEDBACK ABOUT THIS APPLICATION

Local intranet zone

Done

QUOTE APPROVAL REQUEST

Customer : NAME
Attn :

Purchase Order : 722XXXX-XXX, Line Item : 0
SO/CO# : 52XXXX, #28XXXX
Part number : 175XXXXXX Engine Model : 80
C/Code : 34X
S/N :

WorkScope ~122

| ST# | Rep # | Description | Qty. | Unit Price ($) | Extended Price ($) |
|---|---|---|---|---|---|
| 2 | #1 | Clean and Serviceability inspection | 1 | 2XXX.0 | 2XXX.0 |
| 3 | #1 | Clean and Serviceability inspection | 1 | 2XXXX.0 | 2XXXX.0 |
|   | #4 | Mid Ring Inspection. | 1 | 2XX.0 | 2XX.0 |

Total Price : 2XXXX.0

Comments : REPLACEMENT OF CDP FLANGE WAS REQUIRED. THIS ADDED WORKSCOPE INCREASED COST BY $xx,xxx.xx. CUSTOMER PO# XXXXXXXX WAS PREVIOUSLY SHIPPED AND BILLED AT $xx,xxx.xx AND WILL BE RE-BILLED AT $xx,xxx.xx Customer Comments: The quote details are having same operation twice

FIG. 5

FIG. 6

METHODS AND SYSTEMS FOR AVIATION COMPONENT REPAIR SERVICES

CROSS REFERENCE TO RELATED APPLICATIONS

This application claims the benefit of U.S. Provisional Application No. 60/175,178, filed Jan. 7, 2000, which is hereby incorporated by reference in its entirety.

BACKGROUND OF THE INVENTION

This invention relates generally to customer services, and more specifically to methods and systems for accessing turbine engine aircraft components repair order information and services.

Manufacturers of aircraft engines normally provide repair and inspection services for engine and engine components. However, after an inspection of the engine has been completed, or engine component parts sent in for repair have been repaired, communicating the inspection results to engine owners, e.g. customers, has typically been a time consuming and potentially frustrating process for both the engine manufacturer and the customer. Currently communicating inspection results from incoming inspections of aircraft engines or component parts typically involves reporting the results in tabular form, and submitting the reports to customers via mail or facsimile. In addition, variations in the inspections of different facilities is a source of customer concern.

It would be desirable to provide incoming inspection reports to customers which include information in addition to known tabular reports. Since, customers often desire photographs of damaged components or parts found during the incoming inspections, it would be further desirable to have a system capability that provides customers with photographs of damaged components or parts found during incoming inspections. It would be further desirable to provide quotes for repair services, linkage to new spare parts replenishment, and inspection standardization to reduce variations between repair facilities.

BRIEF SUMMARY OF THE INVENTION

In one aspect, the present invention is a computerized business process that captures customer required data elements at the visual inspection process level. The data is gathered via a network-based data capture screen and image capture workstation. The data elements include information regarding aircraft component part repair or non-repairable status, type of repair to be performed, primary non-repairable defect, and digital images of the primary non-repairable defect. The information is uploaded to a database integrated with a component repair businesses ERP system. The data is available for the customer to view through a secure connection to a business entity's Customer Web Center. The customer logs onto the system and accesses an Online Findings Report (OFR) to review the captured data elements and images.

In another aspect, the present invention is a system for accessing aircraft engine repair information by internal users, external customers and prospective external customers. The system includes a server, at least one computer and a network connecting computers to the server. The server is configured with a database of repair order and quote information, and includes a plurality of databases and applications associated with the repair information. The databases provide user interfaces that facilitate a user inputting and receiving information regarding aircraft engine repairs, parts replacement, quotes, and links to other new parts.

BRIEF DESCRIPTION OF THE DRAWINGS

FIG. 4 is an exemplary embodiment of a shop order interface;

FIG. 5 is an exemplary embodiment of a quote approval request interface;

FIG. 6 is an exemplary embodiment of a quote approval interface;

DETAILED DESCRIPTION OF THE INVENTION

Exemplary embodiments of systems and processes that facilitate integrated network-based electronic reporting and workflow process management related to aviation component repair services are described below in detail. The systems and processes facilitate, for example, an electronic submission of information using a client system, automated extraction of information, and web-based assessment reporting and management of components repair services information for system users.

The systems and processes are not limited to the specific embodiments described herein. In addition, components of each system and each process can be practiced independently and separately from other components and processes described herein. Each component and process also can be used in combination with other components and processes.

Figure 1:
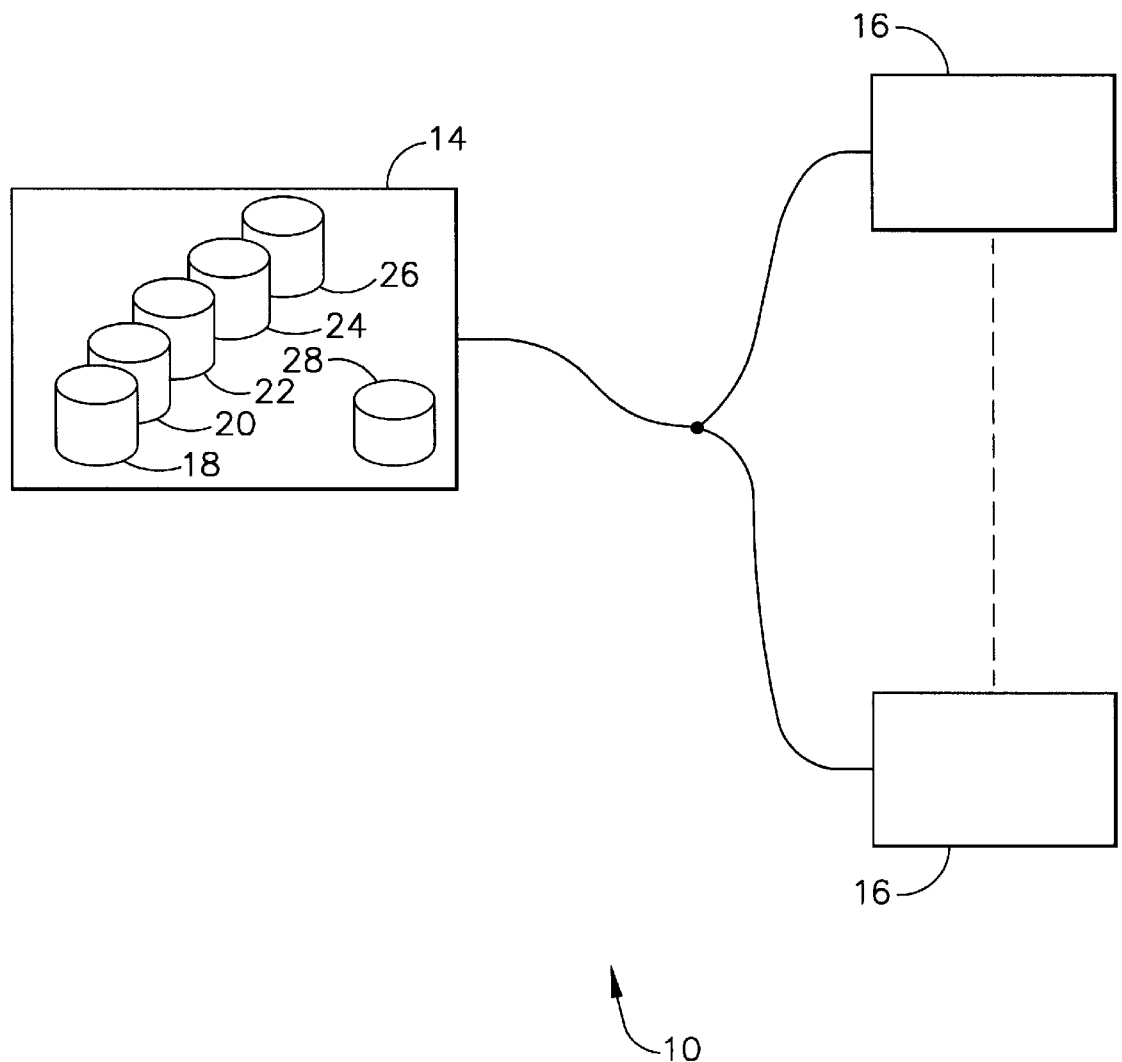
FIG. 1 is an aviation parts and repair system diagram.

FIG. 1 is a block diagram of a system 10 in accordance with one embodiment of the present invention. System 10 includes a server 14 and a plurality of devices 16 connected to server 14. In one embodiment, devices 16 are computers including a web browser, and server 14 is accessible to devices 16 via the Internet. In an alternative embodiment, devices 16 are servers for a network of customer devices.

Devices 16 are interconnected to the Internet through many interfaces including through a network, such as a local area network (LAN) or a wide area network (WAN), through dial-in-connections, cable modems and special high-speed ISDN lines. Alternatively, devices 16 are any device capable of interconnecting to the Internet including a web-based phone or other web-based connectable equipment. A database providing enclosure information is stored on server 14 and is accessible by potential customers at one of devices 16 by logging onto server 14 through one of devices 16.

System 10 is configured to provide various user interfaces whereby users and customers access repair information. Server 14 is further configured with various databases and applications to allow the user to enter repair information. The repair information is uploaded to server 14 for future retrieval. Server 14 accesses stored information and downloads the requested information to at least one of client systems 16 when the request to download is received from client system 16. Server 14 utilizes a number of applications, described in more detail below, that reside on server 14, to store, update, retrieve and download repair information. In one embodiment, users access aircraft engine and component repair information. The databases and applications are accessed by users or customers using client system 16 configured with a standard web browser.

Server 14 is configured with databases and applications 18, 20, 22, 24, 26 and 28 that permit users and customers to access and store information regarding repairs. For example, in one embodiment, server 14 includes an online findings report (OFR) application 18, an online findings report (OFR) database 20, an order-shipping-and-billing (OSB) application 22, an inspector application 24, a new part link database 26 and a user authentication application 28, all described in more detail below. In one embodiment, server 14 and client systems 16 communicate with each other through the Internet using a TCP/IP protocol.

OFR application 18 is a computerized business process that captures customer required data elements at the visual inspection process level. The data is gathered via an intranet data capture screen and image capture workstation. The data elements include information regarding the aircraft component part repair or non-repairable status, type of repair to be conducted, primary non-repairable defect and digital images of the primary non-repairable defect. The information is uploaded to a database integrated with the component repair businesses ERP system. The data is available for customer viewing through a secure connection to a business entity's Customer Web Center. The customer logs onto the system and accesses OFR 18 to review the captured data elements and images.

OFR database 20 includes modules, described in more detail below, for organizing and storing information relating to part order and repair.

An online spare parts module (not shown) is configured to provide a searchable online catalog for spare parts and allow users to order spare parts and obtain information on those orders.

An online product support module (not shown) provides technical documentation online including, but not limited to, service bulletins, an illustrated parts catalog, engine shop manuals, standard practices manuals, engine data submittals, and fleet highlights.

An online overhaul communication module (not shown) allows customers to obtain information on their engine overhaul jobs after the engines have been submitted to the repair shop. In one embodiment, the online overhaul communication module includes a written description and digitized photos of the engine part illustrating the defect.

An online warranty module (not shown) allows customers and repair shops to submit warranty claims and view claim information online.

An online component repair module (not shown) provides two capabilities to the user. More specifically, the online component repair module includes an online catalog providing details regarding repair services offered for individual parts, and a repair order status to the user. System 10 accumulates a variet of data for numerous in-process inspection results, as well as business information that is highly confidential. Therefore, system 10 has different access levels to control and monitor the security of the system. Authorization for access is assigned by system administrators on a need-to-know basis. In an alternative embodiment, system 10 provides access based on job functions. In yet another embodiment of the invention, system 10 provides access based on position and management authority within the business entity. The editing capabilities within system 10 are also restricted to ensure that only authorized individuals have access to modify or edit the information that is already existing in the system. These system security internal controls manage and control access to the information within system 10.

The architectures of system 10, as well as various components of system 10, are exemplary only. Other architectures are possible and can be utilized in connection with practicing the processes described below.

Figure 2:
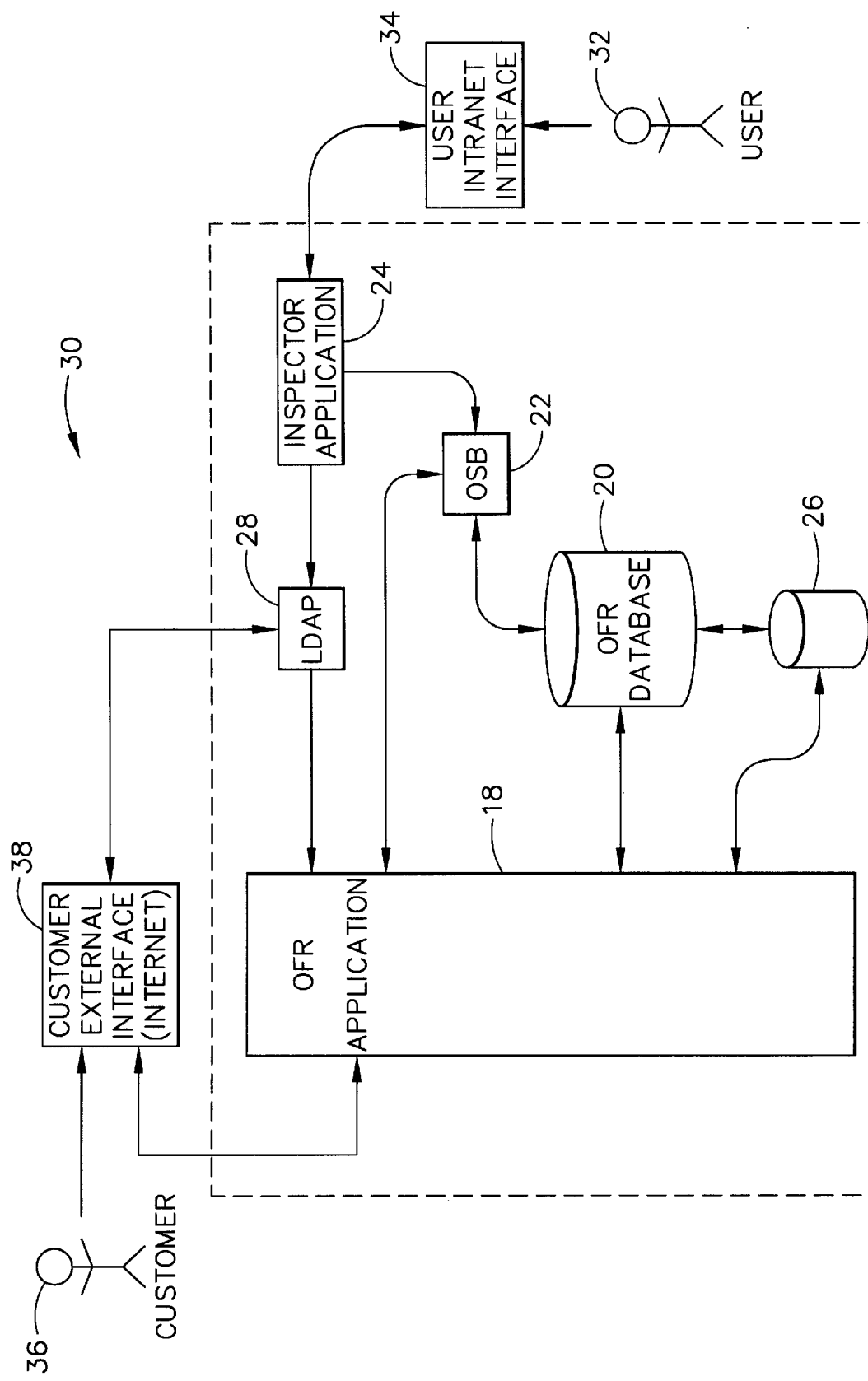
FIG. 2 is a diagram showing information flow within the system of FIG. 1.

FIG. 2 is a flow diagram 30 depicting the relationship among various components of system 10 shown in FIG. 1. As shown in FIG. 2, a user 32 accesses system 10 using client system 16 (shown in FIG. 1) via an intranet interface 34. In an alternative embodiment, user 32 accesses system 10 via an Internet interface (not shown). In the exemplary embodiment shown in FIG. 2, user 32 accesses inspection application 24 to enter information regarding aircraft engine inspection details. For example, user 32 inputs digital images of at least one of non-repairable parts, materials and quotes for repair items for storage in OFR database 20 with linked reference to OSB database 22. However, prior to accepting any information for storage, inspection application 24 authenticates user 32 by validating the user supplied information against the pre-stored user profile in system 10 by the system administrator. The function of validation and authentication is performed by user authentication application 28 which resides on server 14. In one embodiment, inspection application 24 uses a lightweight directory access protocol (LDAP) to authenticate users 32 and customers 36. In addition, in the exemplary embodiment, a user level access permission level is required on quote approvals. An exemplar approval is an "approval button" permitting the user to provide approval authorit directly through system 10. The approval button is displayed on the user interface only if user 32 has quote approval authority.

Typically customer 36 accesses system 10 at one of client systems 16 (shown in FIG. 1), via an external interface 38, such as the Internet. Once customer 36 is verified as an authorized user, or alternatively registered and accepted as a new customer, access is granted to OFR application 18. Using OFR application 18, customer 36 submits queries as repair orders, including filtering criteria, by accessing OSB application 22 and OFR database 30. Using OFR application 18, purchase order details are retrieved from OSB application 22 according to particular customer details, and repair order details populated with OFR database 30. In one embodiment, filtering is date-driven. For example, as a result of filtering, purchase orders between a current date and a date three months previous are retrieved. Additionally, in other embodiments, purchase orders are sortable and viewable for customer 36 (or user 32) by purchase order receipt date, customer name, or by purchase order number. When a purchase order is viewed, details displayed include a purchase order number, a purchase order receipt date, a shop order number, displayed as a link, a part name, part number, an image (if available), and a status of a quote for the part.

If customer 36 or user 32 selects the shop order link, a shop order screen is displayed that includes a customer name, any customer purchase order numbers, a purchase order line, a customer order (CO) line, a part name, a part number, an engine model, an engine serial number, a serial number and a quantity Results of an initial inspection and an initial quote are also displayed. The displayed information also includes a repair category that is one of repairable, non-repairable, salvageable, or serviceable, a scope of repair required, and a quote. All displays, described above and below, are configured to be E-mailed or printed.

Customer 36 can also select a scrap/non-repairable part from the repair details displayed. By selecting and setting search criteria, scrap details are retrieved from OFR database 20. In addition, links to details of new parts for each scrap are displayed from new and used part link database 26. When non-repairable parts are displayed, a link to display scrap details is also displayed. Scrap details include a purchase order number, a part number, a part name, a total quantity for the scrap part and a link to order new parts. For each scrap item, a digital image is displayed. Additionally, for each scrap item, an explanation as to why the item was scrapped and a serial number of the part are also displayed. In addition, system 10 is configured to allow customer input (feedback) about OFR application 18 and associated databases. System 10 is also configured to provide graphical reports, in the form of bar charts.

Figure 3:
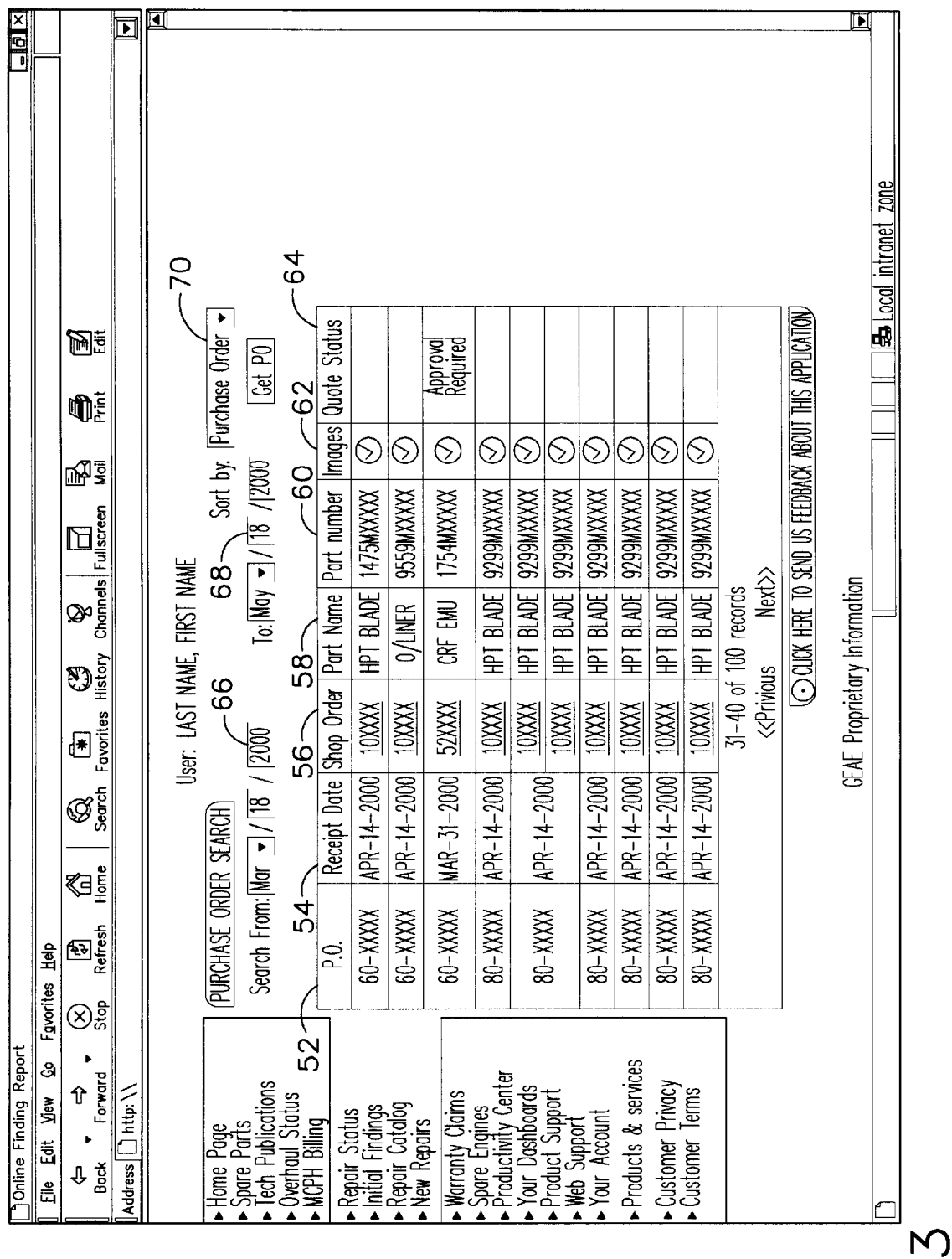
FIG. 3 is an exemplary embodiment of a purchase order interface.

FIG. 3 is an exemplary embodiment of a repair purchase order interface 50. As described above, purchase order interface 50 downloads and displays a repair purchase order number 52, a repair purchase order receipt date 54, a shop order number 56, a part name 58, part number 60, an image availability indicator 62, and a quote status 64. Also included are a search from date field 66, a search to date field 68 and a sort by field 70. The user utilizes various filter criteria to retrieve relevant data from the database. In an exemplary embodiment, selecting and clicking on shop order number 56 hypertext link, system 10 downloads and displays the subsequent user interface (not shown) that depends on the part name associated with the shop order. System 10 also provides alert messages for wrong dates inputted by the user and guides the user to acceptable recognized values. System 10 also provides standard exception handling messages for failure of the database connection.

FIG. 4 is an embodiment of an initial findings and preliminary quote interface 80, also referred to as shop order interface or component repair order interface. Component repair order interface 80 includes a customer name 82, a repair purchase order number 84, a customer order number 86, a purchase order line 88, a CO line 90, a part name 92, a part number 94, an engine model 96, an engine serial number 98, a serial number 100 and a quantity 102. Through component repair order interface 80, system 10 downloads and displays exemplary results of an initial inspection and an initial quote. The displayed information includes a finding categor 104, a repair category 106, a per unit quote 108, a total quote 110, and a part name 112. A hypertext link 114 to a non-repairables screen is also provided. By guiding the user input using component repair order interface, users 32 upload standardized inspection data to OFR database 20, thereby reducing variations in part inspections between various user inspection facilities managed by the business entity.

FIG. 5 is an exemplary embodiment of a printable version of a quote approval request interface 120. Quote approval request interface 120 displays man of the same identification fields as described above. Also included in quote approval request interface 120 is a work scope field 122 which includes descriptions 124 of the work to be performed. A comments field 126 is provided for additional repair work descriptions.

Figure 6:
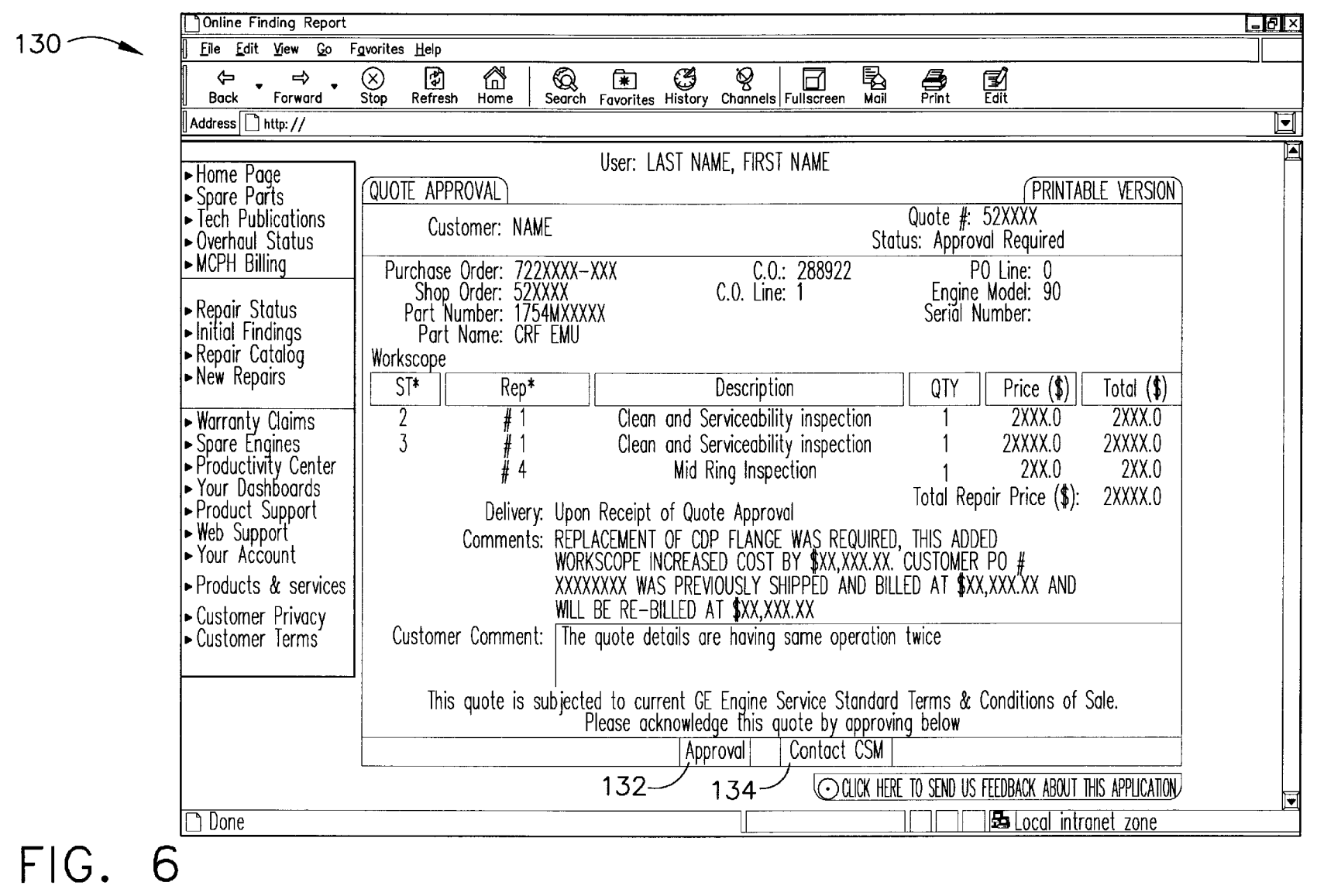

FIG. 6 is an embodiment of a quote approval interface 130 which not only includes all of the fields from printable quote approval request interface 120 (shown in FIG. 5), but also includes a quote approval button 132 and a contact customer service manager button 134. Quote approval button 132 provides a user having authority the ability to approve the work. Quote approval request interface 120 provides a facility for customer approval of purchase order discrepancies and quotes.

Figure 7:
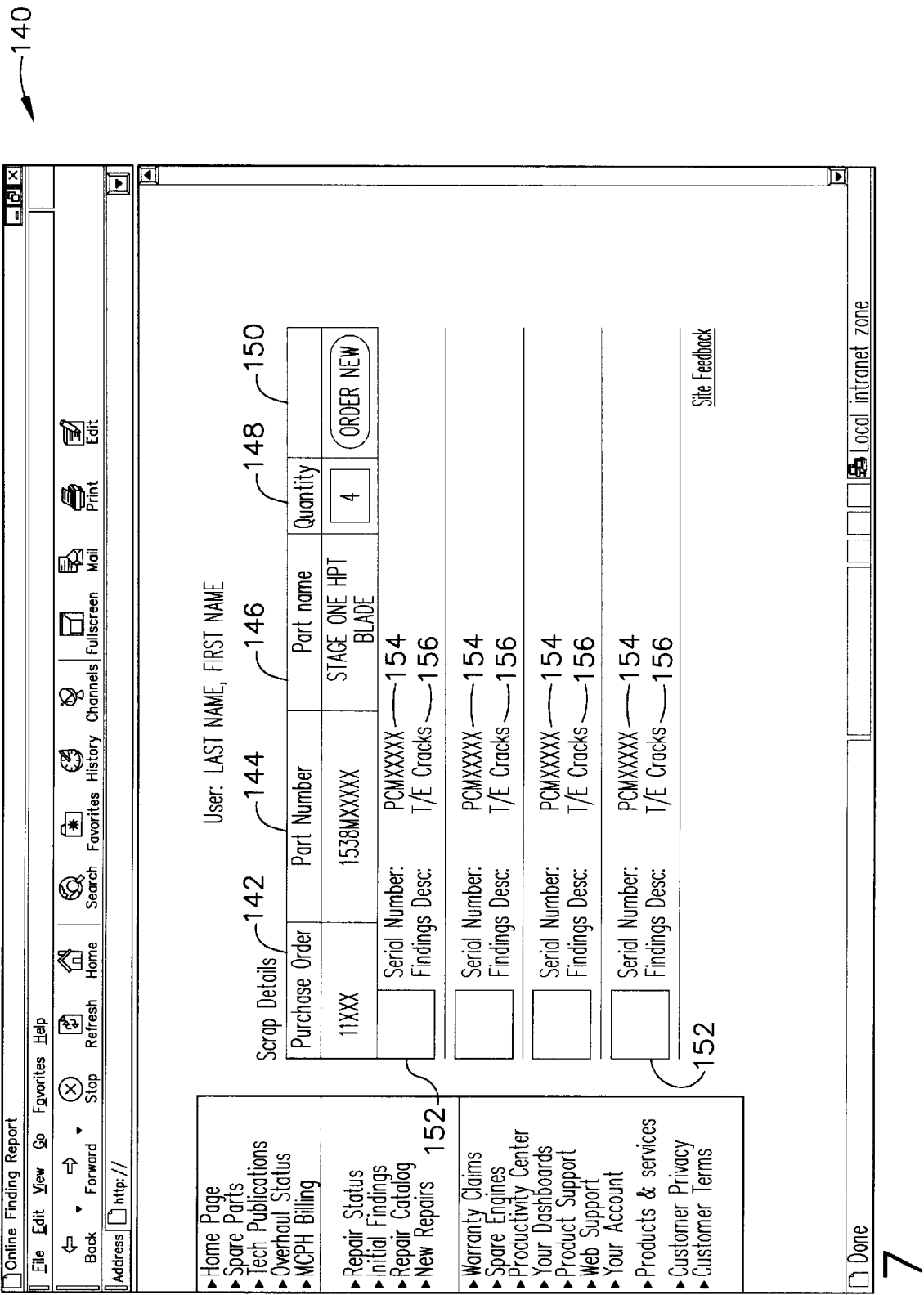
FIG. 7 is an exemplary embodiment of a non-repairables or scrap details interface.

FIG. 7 is an exemplary embodiment of a non-repairables or scrap details user interface 140. Included in user interface 140 are a purchase order number 142, apart number 144, apart name 146, a quantity, 148 and a link 150 which redirects a customer to a new part order screen. For each part displayed, a thumbnail image 152 of the part to be scrapped, a serial number 154 and a description of the inspection findings 156 is also displayed.

The above described repair information system provides customer access to critical repair information concerning aircraft engines owned by the customer. Having access to such information permits a customer to make business decisions regarding aircraft routing, cost of repairs, whether to replace or scrap parts just to name a few.

Figure 8:
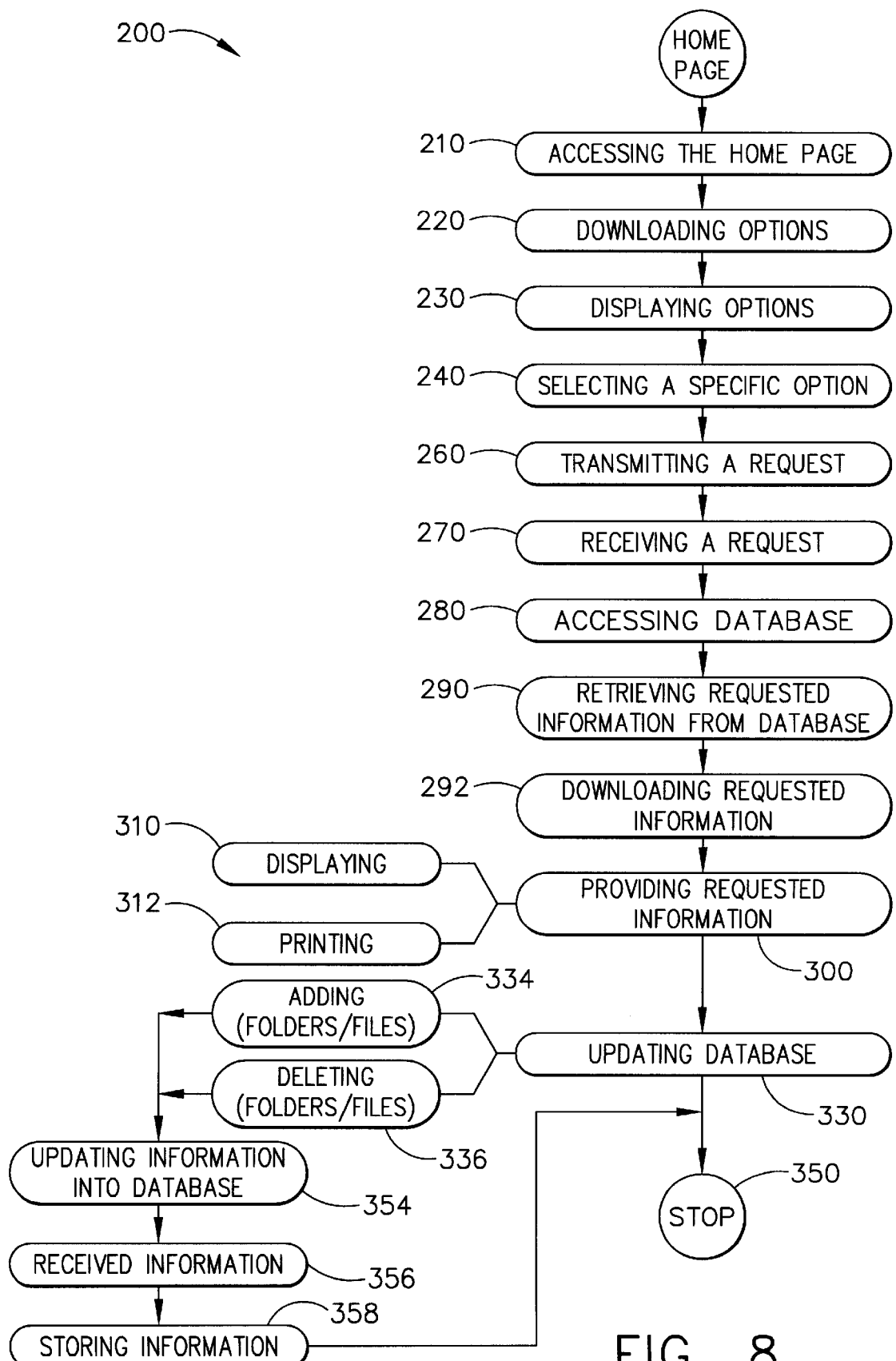
FIG. 8 is a flow chart utilized by the aircraft engine repair system.

FIG. 8 is a flow chart 200 utilized by aircraft engine repair system 10. Under the web-based system 10 (shown in FIG. 1), the user accesses 210 home page of the web site through client system 16 (shown in FIG. 1). Server system 14 (shown in FIG. 1) downloads 220 and displays 230 several options. Once the user selects 240 a specific option out of various hypertext links, the request is sent to server system 14. Selecting 240 a specific option is accomplished either by click of a mouse or by a voice command. The selected option is transmitted 260 to server system 14. Once server system 14 receives 270 a request, server system 14 accesses 280 databases and applications 18, 20, 22, 24, 26, and 28 (shown in FIG. 1) and retrieves 290 pertinent information from databases (shown in FIG. 1). The requested information is downloaded 292 and provided 300 to client system 14 (shown in FIG. 1) from server 14. Server system 14 provides 300 the requested information to the user by either displaying 310 the information on the user's display or by printing 312 it to an attached or a remote printer. The user continues to search various databases for other information, updates 330 the database 20 by adding 334 folders or files, deleting 336 folders or files to database 20 with new or revised information, or exits 350 from system 10.

Updated information 354 is received 356 by server system 14 for storing 358 in appropriate databases. The user also updates 330 the database 20 by adding, deleting or modifying the information regarding a specific engine component (s). In another embodiment, client system 16, as well as server system 14, are protected from access by unauthorized individuals. As described, system 10 is an interactive searchable database 20 for all inspection & repair information and provides flexibility to users to stay current with up-to-date information. The system provides the ability for users to directly update, review and generate quotations based on current information and provide up to date information to customers for their review.

Figure 9:
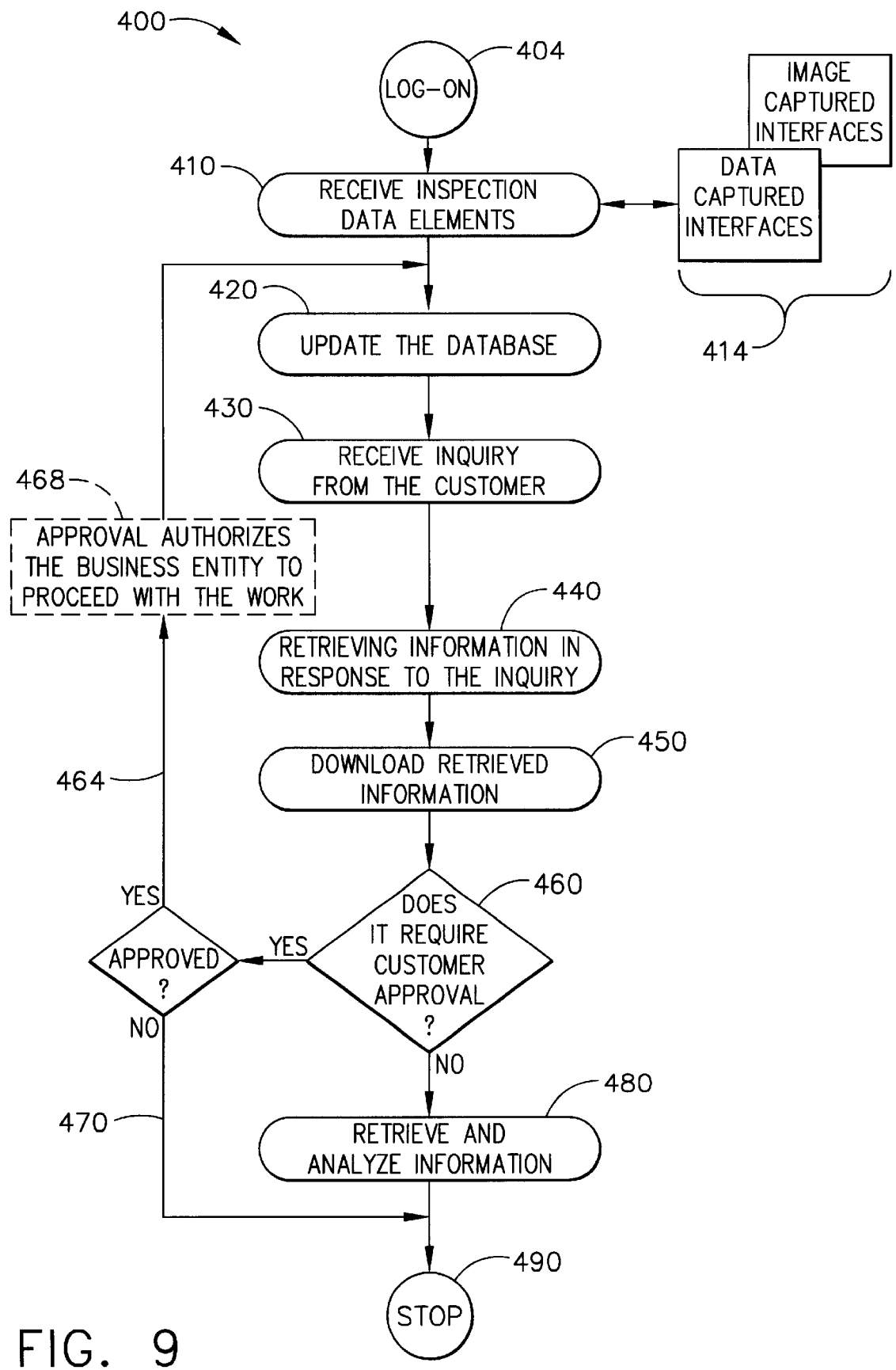
FIG. 9 is an alternative flow chart utilized by the aircraft engine repair system.

FIG. 9 is yet another exemplary embodiment of a method flow chart 400 utilized by the aircraft engine repair system. The method practiced by system 10 is a method for accessing inspection and repair information by internal users and external customers using a aircraft engine repair system Method 400 improves communication and customer satisfaction. Method 400 is practiced by logging 404 onto the system through a network. Method 400 comprises the steps of receiving 410 inspection information. The information that is gathered is gathered via an intranet data capture screen and image capture workstation 414.

Receiving 410 inspection information includes receiving detailed visual inspection information for aircraft engine component parts submitted for repair as well as costs associated with repairing component parts by parts serial numbers. The information received also includes at least one of an aircraft component part repair status, a part non-repair status, a type of repair to be conducted, a primary non-repairable defect status including a cause of non-reparability, digital images of the primary non-repairable defect, and a quote for repairing the type of the repair by the part serial number. Method 400 further comprises the step of updating 420 the centralized database with the received information, receiving 430 an inquiry from a customer to obtain the inspection information, and finally retrieving 440 the inspection information from the centralized database by downloading 450 the requested information in response to the inquiry. The information downloaded includes the part repair status, a part non-repair status, a type of repair to be conducted, a primary non-repairable defect status including a cause of non-reparability, digital images of the primary non-repairable defect, and a quote for repairing the type of the repair by the part serial number. Once the customer reviews the quote, the customer makes the decision 460 to approve or disapprove the quote. If the quote is approved 464, the customer enters the approval in system 10 thereby facilitating the authorization 468 to the business entity to proceed with the work. If the customer decides not to accept 470 the quote, the message is sent to the business entity to not to proceed with the work. In such event, the revision of the quote may be warranted.

In another embodiment of the invention, once the information is retrieved 440 from the centralized database 20 by downloading 450, the customer reviews and analyzes 480 the information since no action on the part of the customer is required. When no action is required from the customer, the retrieved information serves to improve communication with the customer. The customer or the internal user continues reviewing the data or exit 490 from the system. As discussed earlier, system 10 is designed to facilitate communication of inspection and repair information as well as seek approval on repair estimates through the network to expedite the process.

While the invention has been described in terms of various specific embodiments, those skilled in the art will recognize that the invention can be practiced with modification within the spirit and scope of the claims.

What is claimed is:

1. A system for accessing inspection and repair information by internal users and external customers using an aircraft engine repair system to improve communication and customer satisfaction, said system comprising:
    a device; and
    a server system connected to said device and configured to receive inspection information input via said device, said server further configured to:
        update a centralized database with the inspection information;
        receive an inquiry from a customer to obtain the inspection information;
        retrieve the inspection information from the centralized database in response to the inquiry; and
        upload user and customer feedback on the system.

2. A system according to claim 1 wherein said server system is further configured to:
    receive detailed visual inspection information for aircraft engine component parts submitted for repair and costs associated with repairing component parts by parts serial numbers; and
    receive information only from the user that has been authenticated by the system based on pre-established authentication criteria.

3. A system according to claim 2 wherein said server system is further configured to receive at least one of an aircraft component part repair status, a part non-repair status, a type of repair to be conducted, a primary non-repairable defect status including a cause of non-reparability, digital images of the primary non-repairable defect, and a quote for repairing the type of the repair by the part serial number.

4. A system according to claim 1 wherein said server system configured to update the centralized database is further configured to:
    upload the centralized database with at least one of an aircraft component part repair status, a part non-repair status, a type of repair to be conducted, a primary non-repairable defect status including a cause of non-reparability, digital images of the primary non-repairable defect, and a quote for repairing the type of the repair by the part serial number; and
    store the centralized database with at least one of an aircraft component part repair status, a part non-repair status, a type of repair to be conducted, a primary non-repairable defect status including a cause of non-reparability, digital images of the primary non-repairable defect, and a quote for repairing the type of the repair by the part serial number.

5. A system according to claim 1 wherein said server system is further configured to:
    download a repair order and a quote associated with the repair order including at least one of an aircraft component part repair status, a part non-repair status, a type of repair to be conducted, a primary non-repairable defect status including a cause of non-reparability, digital images of the primary non-repairable defect, and a quote for repairing the type of the repair by the part serial number; and
    download hypertext links to other user interfaces for part replacement, including new spare parts.

6. A system according to claim 1 wherein said sever system is further configured to:
    upload user and customer feedback on the system;
    standardize inspection data thereby reducing variations in part inspections between various user inspection facilities;
    download purchase order discrepancies and a quote approval; and
    upload customer approval for purchase order discrepancies and quotes.

7. A system according to claim 1 where in said server system is further configured to:
    standardize inspection data thereby reducing variations in part inspections between various user inspection facilities;
    download purchase order discrepancies and a quote approval; and
    upload customer approval for purchase order discrepancies and quotes.

8. A system configured for accessing aircraft engine repair information by internal users, external customers and prospective external customers, said system comprising:
    at least one device; and
    a server system connected to a database, said database containing repair order and quote information;
    a secured network providing access to only authorized users, including at least one of an internal user, an external customer, and a prospective external customer, based on predetermined authentication criteria, said secured network connecting said device to said server system; and said server system configured to receive information input via said device, said server system further configured with a plurality of web pages associated with the repair information, said server system further configured with a user interface allowing a user to input information into the web pages for uploading the information to said server system including order placement and allowing the user to download into the web pages information from said database including quotes for repair of repairable parts and provide capability to the user to approve the quote on-line, if desired by the user to expedite the approval process, said server system further configured to upload user and customer feedback on said system.

9. A method for accessing inspection and repair information by internal users and external customers using a aircraft engine repair system to improve communication and customer satisfaction, the system including a server, a centralized database, and at least one client system, said method comprising the steps of:

receiving inspection information;

updating the centralized database with the inspection information;

receiving an inquiry from a customer to obtain the inspection information;

retrieving the inspection information from the centralized database in response to the inquiry; and uploading user and customer feedback on said system.

10. A method according to claim 9 wherein said step of receiving inspection information further comprises the steps of:

receiving detailed visual inspection information for aircraft engine component parts submitted for repair and costs associated with repairing component parts by parts serial numbers; and receiving information only from the user that has been authenticated by the system based on pre-established authentication criteria.

11. A method according to claim 10 wherein said step of receiving detailed visual inspection information further comprises the step of receiving at least one of an aircraft component part repair status, a part non-repair status, a type of repair to be conducted, a primary non-repairable defect status including a cause of non-reparability, digital images of the primary non-repairable defect, and a quote for repairing the type of the repair by the part serial number.

12. A method according to claim 9 wherein said step of updating the centralized database with the inspection information further comprises the steps of:

uploading the centralized database with at least one of an aircraft component part repair status, a part non-repair status, a type of repair to be conducted, a primary non-repairable defect status including a cause of non-reparability, digital images of the primary non-repairable defect, and a quote for repairing the type of the repair by the part serial number; and storing the centralized base with at least one of an aircraft component part repair status, a part non-repair status, a type of repair to be conducted, a primary non-repairable defect status including a cause of non-reparability, digital images of the primary non-repairable defect, and a quote for repairing the type of the repair by the part serial number.

13. A method according to claim 9 wherein said step of retrieving the inspection information from the centralized database in response to the inquiry further comprises the steps of:

downloading a repair order and a quote associated with the repair order;

downloading hypertext links to other user interfaces for part replacement, including new spare parts.

14. A method according to claim 13 wherein said step of downloading the repair order and the quote further comprises the step of downloading at least one of an aircraft component part repair status, a part non-repair status, a type of repair to be conducted, a primary non-repairable defect status including a cause of non-reparability, digital images of the primary non-repairable defect, and a quote for repairing the type of the repair by the part serial number.

15. A method according to claim 9 wherein said step of retrieving the inspection information from the centralized database in response to the inquiry further comprises the step of uploading user and customer feedback on the system.

16. A method according to claim 9 wherein said step of retrieving the inspection information from the centralized database in response to the inquiry further comprises the step of standardizing inspection data thereby reducing variations in part inspections between various user inspection facilities.

17. A method according to claim 9 wherein said step of retrieving the inspection information from the centralized database in response to the inquiry further comprises the steps of:

downloading a quote approval; and uploading customer approval for purchase order discrepancies and quotes.

18. A method according to claim 9 wherein said step of retrieving the inspection information further comprises the steps of:

displaying various user interfaces identifying at least one of an aircraft component part repair status, a part non-repair status, a type of repair to be conducted, a primary non-repairable defect status including a cause of non-reparability, digital images of the primary non-repairable defect, and a quote for repairing the type of the repair by the part serial number, displaying information in the standardized inspection data format thereby reducing variations in part inspections between various user inspection facilities; and displaying a quotation for the customer approval, said step of displaying a quotation further comprises the steps of:

generating the quotation based on the inspection information stored in the centralized database; and printing the quotation based on the inspection information.

19. A method according to claim 9 wherein the server system and at least one client system are connected via a network, and wherein the network is one of a wide area network, a local area network, an intranet and the Internet.

* * * * *